United States Patent [19]

Benton

[11] 4,419,587
[45] Dec. 6, 1983

[54] OUTPUT POWER MODULATED WIND RESPONSIVE APPARATUS

[75] Inventor: William M. Benton, Middleburg, Va.

[73] Assignee: Vericard Corporation, Fort Lauderdale, Fla.

[21] Appl. No.: 301,176

[22] Filed: Sep. 11, 1981

[51] Int. Cl.³ .......................... F03B 1/02; F03D 3/02; B63H 13/00
[52] U.S. Cl. ....................................... 290/44; 290/55; 416/197 A; 416/142; 440/8
[58] Field of Search ............... 290/44, 55; 416/197 A, 416/142 B, 143, 117; 440/8, 86

[56] References Cited

U.S. PATENT DOCUMENTS

| 752,764 | 2/1904 | Dunne | 416/197 A |
|---|---|---|---|
| 1,471,870 | 10/1923 | Tust | 440/8 |
| 3,581,663 | 6/1971 | Lohmann | 416/197 A |
| 3,771,924 | 11/1973 | Buchstaller | 416/143 X |
| 4,371,346 | 2/1983 | Vidal | 290/55 X |
| 4,382,190 | 5/1983 | Jacobson | 416/117 X |

FOREIGN PATENT DOCUMENTS

| 187872 | 12/1954 | Austria | 416/197 A |
|---|---|---|---|
| 2802720 | 7/1979 | Fed. Rep. of Germany | 416/142 B |
| 2821899 | 11/1979 | Fed. Rep. of Germany | 416/197 A |

*Primary Examiner*—J. V. Truhe
*Assistant Examiner*—W. E. Duncanson, Jr.
*Attorney, Agent, or Firm*—Lowe, King, Price & Becker

[57] ABSTRACT

A wind responsive power generating apparatus (20) comprises a pair of normally mutually orthagonal cross arms (22,24) carrying impeller members (22a,22b, 24a,24b) that apply torque to a load (38) through an output shaft (26). The power output of the apparatus (20) is reduced from maximum by reducing the angle between adjacent cross arms and simultaneously rotating impeller members about corresponding cross arm axes to provide air spillthrough. The impellers are selectively vented by valves (46) to reduce drag as each impeller member swings upstream. Operation of the valves (46) is synchronized to impeller rotation and wind direction by a synchronization device (54). Various different types of impeller members and applications are disclosed.

19 Claims, 19 Drawing Figures

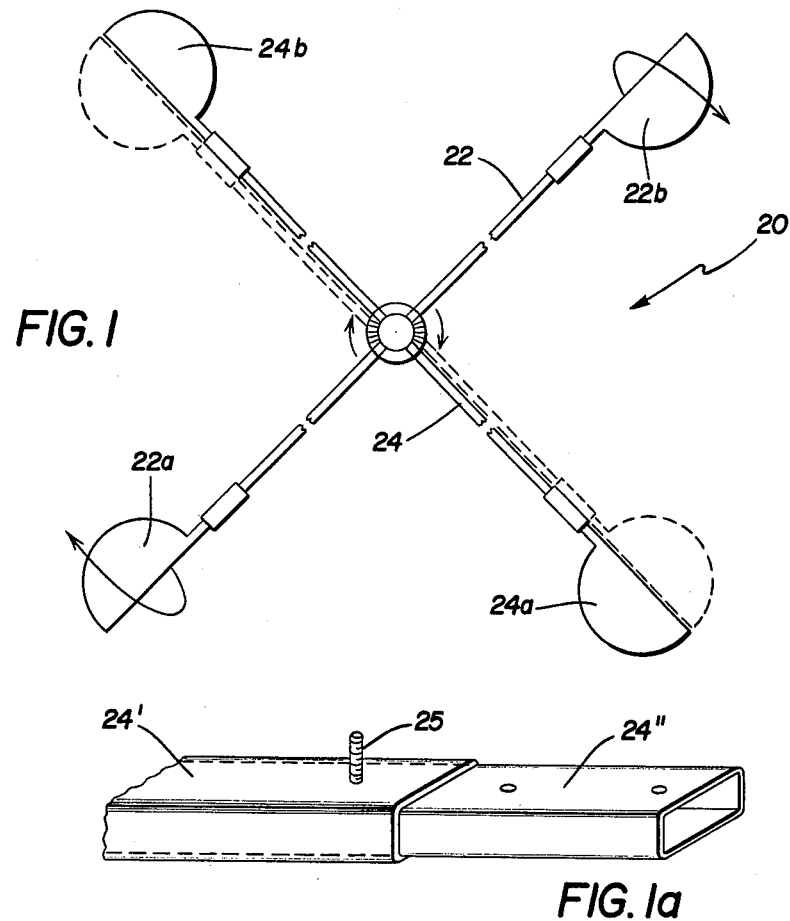
FIG. 1
FIG. 1a
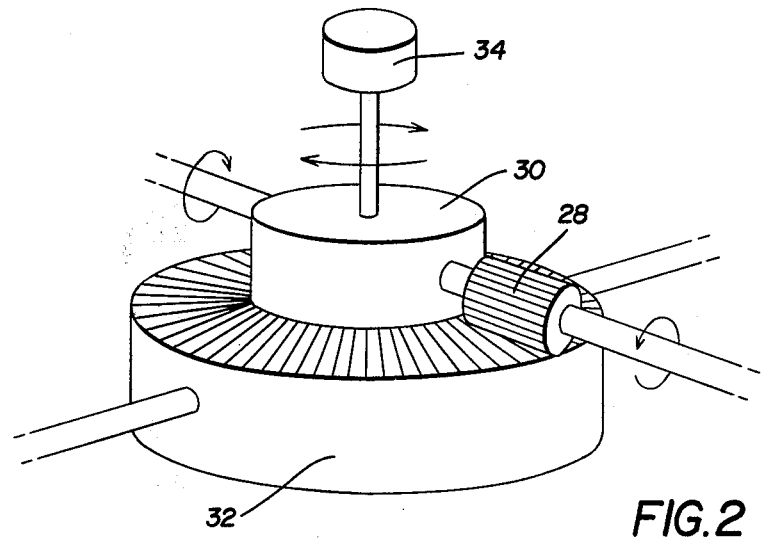
FIG. 2

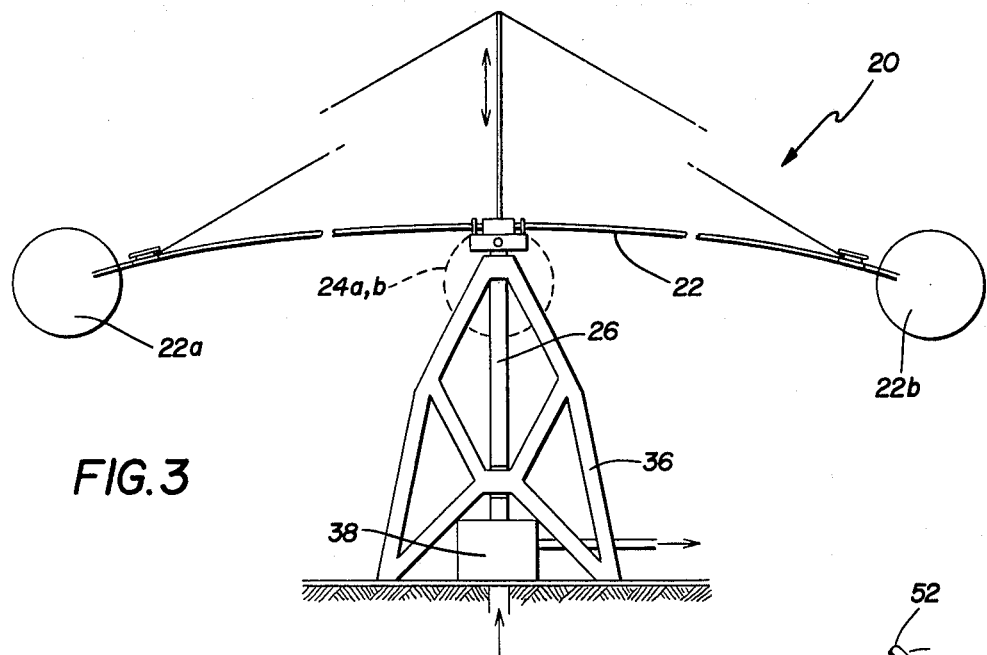
FIG.3
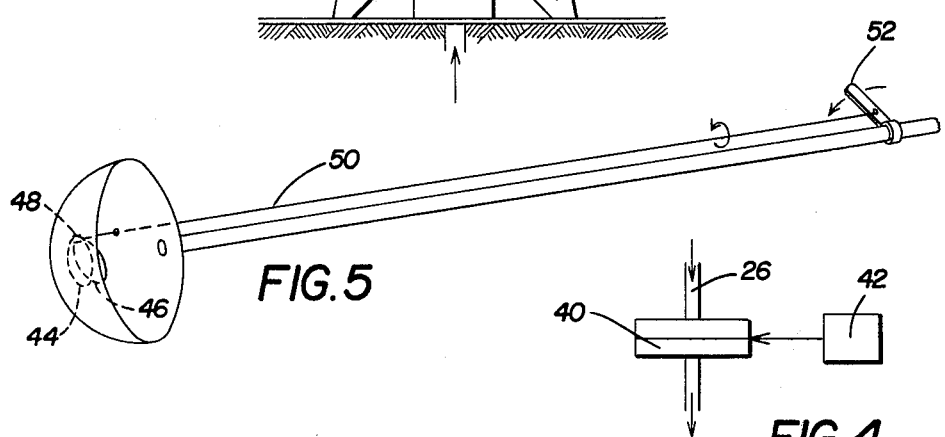
FIG.5
FIG.4
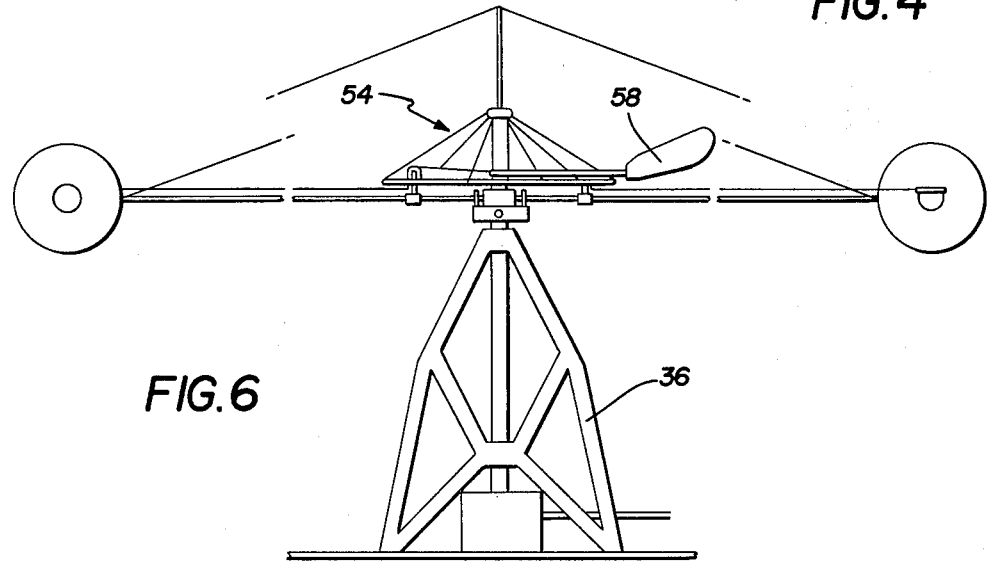
FIG.6

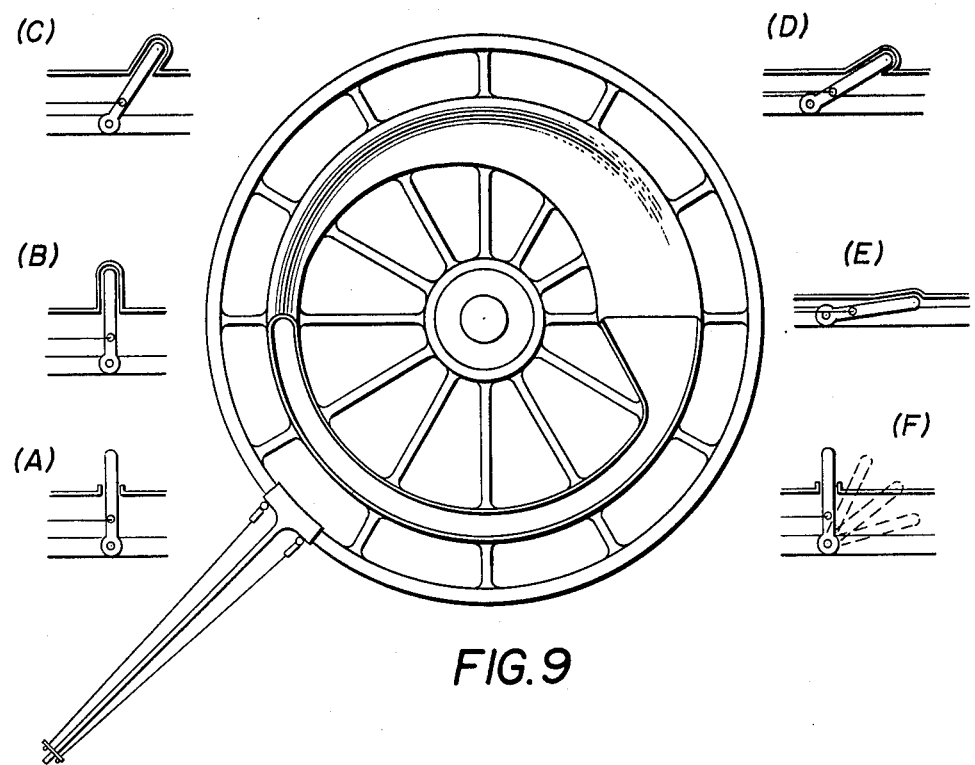
FIG. 9
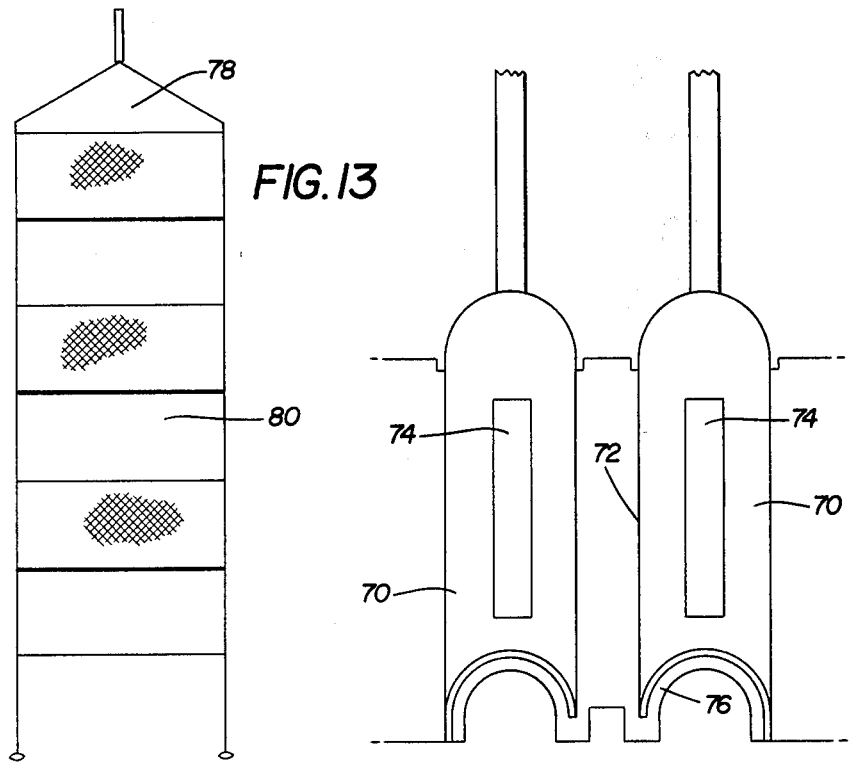
FIG. 13
FIG. 12

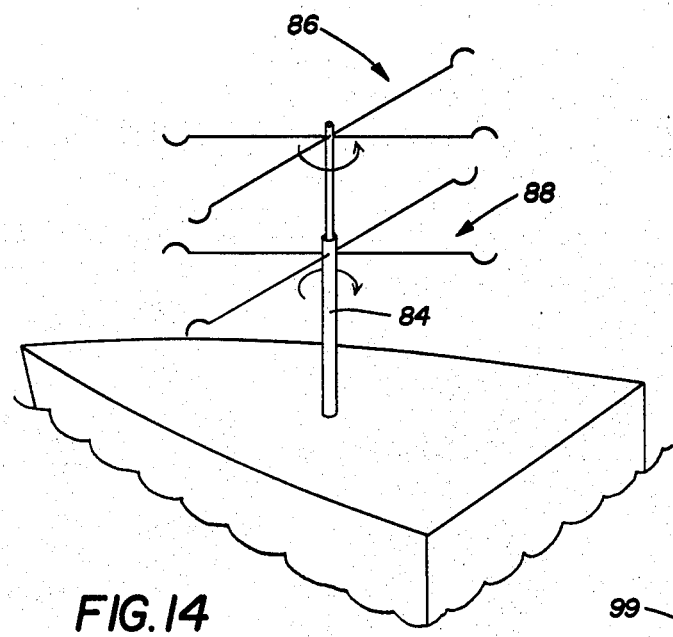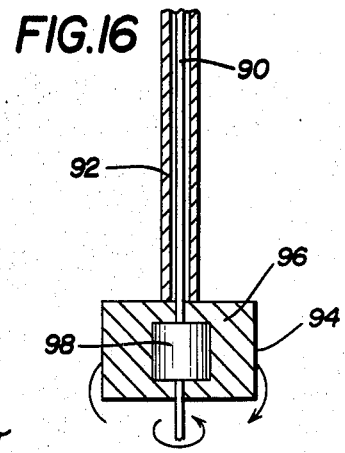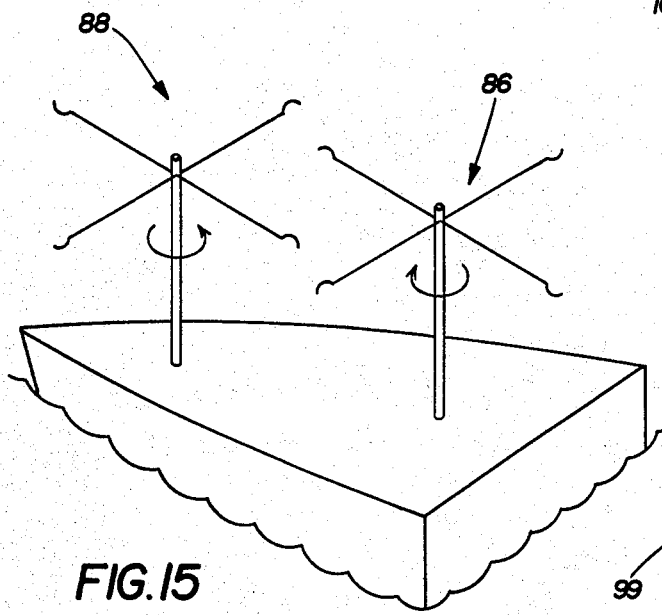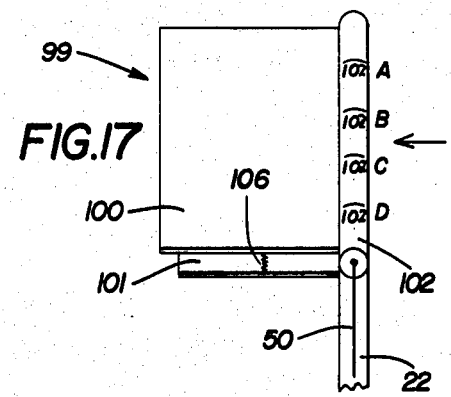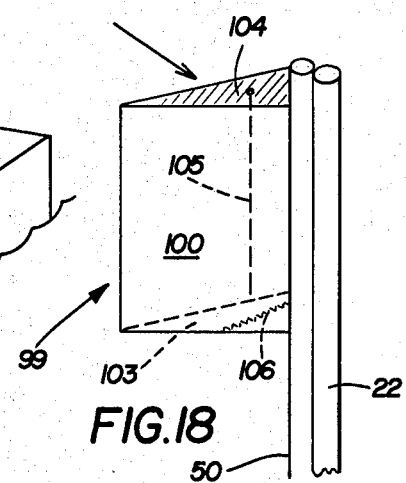
FIG.14
FIG.15
FIG.16
FIG.17
FIG.18

OUTPUT POWER MODULATED WIND RESPONSIVE APPARATUS 00202

TECHNICAL FIELD

The present invention relates generally to wind responsive apparatus for generating electrical energy, and more particularly, toward systems for improving the energy conversion efficiency of such apparatus, for reducing likelihood of damage to the apparatus caused by destructive wind forces and for providing controlled energy conversion modulation.

BACKGROUND ART

In the past, numerous apparatus have been provided for converting the forces of natural wind into useful work. Substantial work in this technology has taken place in the early part of the century, as exemplified by the patents to Holterud U.S. Pat. No. 1,415,645 and Nolan U.S. Pat. No. 1,416,052. Throughout the middle of the century, there was somewhat of a reduction in this technology as fossil fuel became an increasingly significant energy source. Recently, however, renewed interest in energy sources derived from naturally occurring phenomena such as wind, has taken place in view of present and predicted shortages in the supply of fossil fuel. Examples of recent developments in wind powered energy conversion apparatus are Wiggin U.S. Pat. No. 3,212,470, Ri U.S. Pat. No. 3,942,025, Baum, Sr. et al U.S. Pat. No. 4,177,009, Wurtz U.S. Pat. No. 4,186,313, Kephart, Jr. U.S. Pat. No. 4,177,014 and Bolie U.S. Pat. No. 4,204,805.

I have determined that such wind responsive apparatus, although generally usable, typically display various deficiencies. For example, wind responsive apparatus are generally formed with some type of impeller that has a surface which reacts with wind to develop a torque. This torque is transferred to a shaft that in turn is coupled to an electrical generator, such as in the Ri U.S. Pat. No. 3,942,025 or, in some instances, is directly coupled to a work producing element, such as in the Wiggin U.S. Pat. No. 3,212,470. These impellers provide various degrees of energy conversion efficiency that typically is substantially less than an optimum conversion efficiency. One reason for reduced energy conversion efficiency is that as the wind acts on the surface of the impeller, the impeller is rotated downstream by wind forces. As the impeller rotates upstream, however, the wind creates drag that tends to retard movement of the impeller and thereby reduces the energy conversion efficiency of the apparatus. Techniques have been developed to reduce upstream drag on the impeller by continuously changing the orientation of the impeller as a function of wind direction relative to the impeller surface, such as in Wurtz U.S. Pat. No. 4,186,313 or by providing air holes or flaps, as in Kephart, Jr. U.S. Pat. No. 4,177,014. These techniques have had a tendency to be inefficient because impeller orientation or wind spill-through is not accurately controlled as a function of relative wind direction. Further, apparatus using these techniques are typically complex.

As another deficiency, such apparatus, although responsive to and effective with normal wind currents, are prone to damage in storm conditions or during turbulent or excessive wind conditions. There is therefore presently a need for wind powered energy conversion apparatus of the type described above that is relatively impervious to excessive wind currents, turbulence or the like. There further exists need to provide energy output modulation in such apparatus, i.e., to provide some means for controlling energy conversion efficiency whereby conversion efficiency may be manually or automatically reduced in response to excessive wind conditions to protect the conversion apparatus or driven load, or, to control the amount of energy to be supplied to a load as a function of load requirements.

In mobile installations, such as on the hull of a sea vessel to supply energy to operate the vessel or to operate accessories or on a land vessel to enable wind responsive energy to be supplied at remote locations, the impeller must, in practice, be relatively large to enable an adequate amount of energy to be generated. There is a potential problem, however, that occurs in such portable apparatus, wherein, in the case of a sea vessel, the impeller array is too large to pass between narrow straits or interferes in critical docking maneuvers. In the case of a land vehicle, the impellers are frequently too large to enable the vehicle to pass through a tunnel or other obstacle without first disassembling the impellers. There therefore exists a need to enable large impeller arrays to be folded or otherwise adjusted, without disassembly, to enable the impellers to occupy as little space as possible.

Accordingly, one object of the present invention is to provide a new and improved wind responsive power generating apparatus that lacks the various deficiencies of corresponding prior art apparatus of the type noted above.

Another object is to provide a new and improved wind responsive power generating apparatus that has improved energy conversion efficiency and durability.

Another object is to provide a wind responsive power generating apparatus that adapts to wind direction to reduce drag by controlling impeller spill-through.

Still another object is to provide a wind responsive power generating apparatus wherein output power is modulated in response to wind conditions or in response to load requirements.

Another object is to provide a wind responsive power generating apparatus having impellers that fold and extend and retract to minimize occupation of space for improved transport ability.

In marine vessel applications of the type shown in the Wiggin U.S. Pat. No. 3,212,470, wherein rotating impellers are directly coupled to a submerged propeller to propel the vessel in water, there is a tendency for the craft to drift port or starboard because the rotating impellers tend to induce a clockwise or counterclockwise torque against the vessel. There exists the need, therefore, to compensate such an undesirable torque so that the vessel will maintain course. Alternatively, it is desirable to control such a torque to enable the vessel to be maneuvered or steered as an augment to or in lieu of, the standard rudder.

Another object of the present invention therefore is to provide a wind responsive power generating apparatus in a sea vessel, wherein clockwise or counterclockwise torques tending to undesirably steer the vessel port or starboard are eliminated.

Another object is to provide independent or augmented steering of the sea vessel using wind responsive impellers.

In high winds, great wave heights and listing of the sea vessel, it is desirable to manually or by electric or hydraulic action, have the capability to retract and promote stability by decreasing the length of the impeller; otherwise a listing vessel might cause an impeller to strike a high wave. The decreased length allows power collection in otherwise unmanageable wind or wave conditions.

Thus, another object of the invention is to take advantage of increased torque applied on an impeller shaft by wind by controlling the length of impeller cross arms.

DISCLOSURE OF INVENTION

A wind responsive, power generating apparatus comprises a pair of mutually orthogonal cross arms connected on a shaft that is mounted to a frame. Impeller means, such as cup-shaped or cylindrical elements, or wedge-shaped elements, are mounted on the cross arms to cause the impeller means, cross arms and shaft to rotate in response to wind. The shaft is coupled to a suitable load, such as a sea vessel propeller or an electric generator that supplies primary or accessory power to a sea vessel, land vehicle or stationary installation.

Energy conversion efficiency in the apparatus is optimized by providing air spillthrough openings or vents in the impeller means, and selectively enclosing the vents by valves to minimize drag as each impeller swings upstream of the wind. The valves are synchronized to wind direction such that the spillthrough vents are closed as each impeller is driven downstream by the wind and is opened to provide air spillthrough as the impeller returns upstream.

The two cross arms are normally mutually orthogonal to provide optimum energy conversion efficiency. The energy conversion efficiency is selectively reduced by reducing the angle between cross arms to less than 90° using an adjustment mechanism that rotates the first cross arm relative to the second cross arm while simultaneously rotating the first cross arm mounted impellers about the cross arm axis. At an extreme, with the two cross arms lying mutually parallel and with corresponding impellers on the two cross arms in opposed positions, the energy conversion efficiency of the apparatus is reduced to substantially zero rendering the apparatus dormant and in compact position for transportation.

To prevent stalling of an electric generator or other load during low wind velocity conditions, a clutch arrangement is provided whereby the load is maintained out of gear with or decoupled from the impellers until the rotational velocity of the impellers reaches a predetermined value. Thereafter, the impellers and load are coupled to each other to enable the load to be driven without risk of stalling. When wind velocity falls below the predetermined value, the load is again decoupled from the impellers to prevent stalling.

To reduce the tendency of the impellers, when mounted on the sea vessel, to undesirably steer the vessel port or starboard due to torque imparted on the vessel by unidirectional rotation of the impellers, a pair of impellers are mounted coaxially or on different axes on the vessel to cause any imparted steering torques to cancel each other out. Alternatively, the rotational velocity of one of the sets of impellers relative to the other can be controlled to provide a net port or starboard steering torque to provide vessel steering or maneuvering or, alternatively, to augment steering.

The magnitude of the output torque may be controlled by adjusting the lengths of the cross arms. Thus the cross arms may be formed with square or octagonal inserts within outer cross arm or sleeve members to prevent slippage or misalignment. The outer arm and insert are controlled manually or by hydraulic or electric motors to telescope by various amounts depending upon output torque desired and wind and wave conditions. The cross arms are fixed in length by pins or screws or other means.

Still other objects and advantages of the present invention will become readily apparent to those skilled in this art from the following detailed description, wherein I have shown and described several embodiments of the invention contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

DESCRIPTION OF THE DRAWINGS

FIG. 1 is a top view of a set of impellers supported on normally mutually orthogonal cross arms, with the angle between cross arms being adjustable to modulate power output, in accordance with one aspect of the invention;

FIG. 1a is a partial view of a telescoping cross arm in accordance with an aspect of the invention;

FIG. 2 is a detailed view of a hub assembly for controlling the magnitude of angle between cross arms together with rotational orientation of one pair of impellers;

FIG. 3 is a plan view showing vertical indexing of cross arms to selectively engage or disengage the impellers from a load in response to wind velocity;

FIG. 4 is a detailed diagram showing a device for providing selective coupling between impellers and load in accordance with FIG. 4;

FIG. 5 is a detailed view of an impeller showing operation of an air spillthrough valve;

FIG. 6 is an elevation view of the apparatus showing the operation of air flowthrough valves on opposed impellers;

FIG. 9 is a plan view of the first embodiment corresponding to FIG. 7, including schematic representations of control arm position as a function of wind direction to provide air spillthrough synchronization;

FIG. 12 is a partial perspective view of a set of impellers in the form of cylindrical members having air spillthrough openings;

FIG. 13 is an elevation view of the cylindrical impellers shown in FIG. 11;

FIG. 14 is a simplified perspective view of a sea vessel provided with a pair of oppositely rotating impellers to cancel or control applied steering torque, in accordance with one aspect of the invention;

FIG. 15 is a partial perspective view of a sea vessel provided with oppositely rotating impellers on separate, parallel axes to cancel or control steering torque in accordance with another aspect of the invention;

FIG. 16 is a partial view of an electric generator coupled to an impeller shaft having inner and outer concentric portions carrying, respectively, oppositely rotating impellers to increase energy conversion efficiency.

FIG. 17 is a wind wedge type impeller in a closed position for minimum wind resistance; and, FIG. 18 is the wind wedge impeller in open or extended position for maximum wind collection.

BEST MODE FOR PRACTICING THE INVENTION

Figure 7:
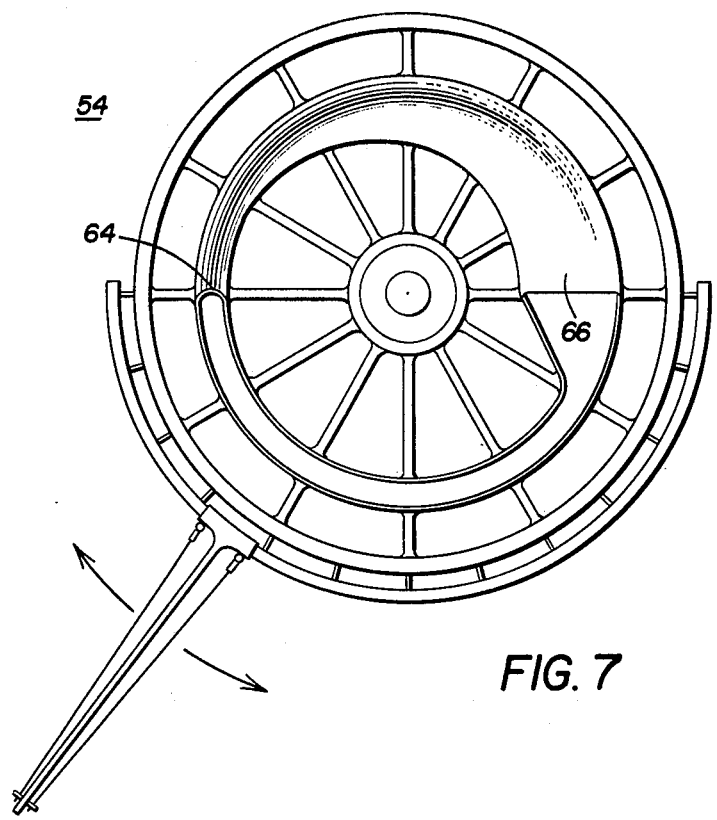
FIG. 7 is a plan view of one embodiment of a device for synchronizing the air spillthrough valves to relative wind direction.

Referring to FIG. 1, in accordance with one aspect of the invention, an impeller set or array, designated generally by 20, comprises a first cross arm 22 and a second cross arm 24 normally mutually orthogonal with the first cross arm 22. Each of the cross arms 22, 24 is coupled to a central vertical shaft 26 (See FIG. 3) and carries a pair of impeller members 22a, 22b and 24a, 24b, respectively. The impellers 22a, 22b, 24a, 24b are preferably positioned at the ends of the respective cross arms 22, 24 but may be positioned elsewhere on the arms. The cross arms 22,24 may be fixed in length or alternately may be formed of telescoping members 24',24" as shown in FIG. 1a. The members 24',24" are preferably square or of other non-circular configuration to prevent slippage and ensure stability. The edges of the cross arm assembly shown in FIG. 1a may be rounded somewhat for streamlining if desired. The length of the member 24',24" is fixed by pin 25 or similar element.

Each section of cross arm 24 is coaxially connected to a pinion 29 (see FIG. 2) that in turn is rotatably mounted to a central hub 30. The hub 30 in turn is mounted coaxially on a larger ring gear 32 and is journaled, by means not shown, to the ring gear.

With reference again to FIG. 1, each of the impellers 22a, 22b, 24a, 24b is oriented on its corresponding arm portions with the cross arms 22 and 24 mutually orthogonal, as shown. Thus, when the cross arms 22,24 are mutually orthogonal, the impellers are adapted to receive wind currents on the inner surface portion of each impeller with minimum spillover to provide optimum reaction to wind forces. At this point, it should be noted that the impellers 22a,22b, 24a and 24b are hemispherical or "cup-shaped". It is to be understood, however, that other configurations can be used as long as reaction to wind forces is maximum when the impellers are in the relative positions shown in FIG. 1.

To reduce the reaction of the impellers 22a, 22b, 24a and 24b to wind forces and thereby modulate the power output of the apparatus 20, a motor 34 (FIG. 2) is operated to rotate central hub 30 relative to ring gear 32. As the hub 30 rotates relative to the ring gear 32, the cross arms 22, 24 become non-orthogonal until, at an extreme, the two cross arms are parallel to each other, shown in dotted lines in FIG. 1. Simultaneously, as the hub 30 and ring gear 32 rotate relative to each other, the pinion 28 rotates, together with its connected cross arm portion, over the surface of the ring gear 32. Thus, as the hub 30 is rotated about a vertical axis by motor 34, opposite portions of cross arm 22 rotate about a horizontal axis, as shown by the arrows in FIG. 1. The teeth on pinion 28 and the teeth on the surface of ring gear 32 are sized such that the cross arms 22 rotate 180° in response to a 90° rotation of hub 30. In the extreme position of arm 22, shown in dotted lines in FIG. 1, impellers 22a, 22b are in opposed positions relative to corresponding impellers 24a, 24b. As the impellers 22a, 22b rotate on cross arm 22, air spillover occurs with respect to the impellers to reduce torque applied to shaft 26 by wind forces and thereby provide spoiling or modulating of the impellers. In the extreme position shown in FIG. 1 wherein cross arms 22 and 24 are parallel to each other and wherein corresponding impellers 22a and 24b and impellers 24a and 24b are opposed, the impellers are very poorly responsive to wind forces and the array 20 is virtually disabled. Of particular importance, however, by rotating hub 30 relative to ring gear 32, continuous modulation of the wind responsive torque applied to output shaft 26 is provided. Furthermore, with the impellers located in the folded position or "extreme" position of FIG. 1, the impellers occupy minimum space making transportation convenient. This is particularly important wherein the apparatus 20 may be mounted on a sea vessel, for example, and wherein the impellers are normally too large to enable the vessel to pass between narrow straits or to enable delicate docking maneuvers. As another example, when the apparatus 20 is mounted on a land vehicle, such as a truck, the impellers may be folded to the "extreme" position of FIG. 1 to enable the vehicle to pass through tunnels, etc., wherein transverse space is limited.

Referring to FIG. 3, the impellers 22a, 22b, 24a, 24b and cross arms 22, 24 may be mounted on a frame 36 positioned on land to pump fluid as shown, or to generate electricity or may be mounted on a vessel as mentioned above and discussed in more detail below. In any event, there is a tendency for the apparatus 20 to stall under load in response to low velocity wind. In accordance with another aspect of the invention, to minimize the likelihood of stall in low velocity wind conditions, shaft 26 is normally decoupled from load 38 which, as aforementioned, may be an electric generator, pump or other load, until sufficient wind conditions exist to ensure that the wind will provide sufficient force on the impellers to drive the load without stalling. With reference to FIG. 4, a clutch 40 is positioned between output shaft 26 and load 38. The clutch, which may be a magnetic clutch, fluid clutch or other type, is controlled by the output of a conventional wind velocity sensor 42 that generates a signal proportional to wind velocity. The wind velocity responsive signal is amplitude compared to a reference signal that corresponds to a wind velocity that is known to be sufficient to drive load 38 without stalling. The clutch 40 is thus controlled by the output of a comparator (not shown) to maintain clutch 40 normally decoupled and to maintain the clutch coupled only during sufficient wind conditions to drive load 38. It can be appreciated that, assuming that air flow is from left to right, clockwise rotation will be imparted to the apparatus 20 as wind impinges on the inner surface of each impeller as it moves downstream of the wind. In the instantaneous position of the impellers shown in FIG. 2, the upper two impellers 24b, 22b are moving downstream of the wind. The remaining two impellers 24a, 22a, on the other hand, are moving upstream. Because wind impinges on the outer surface of these two impellers, drag is established that tends to retard rotation. In accordance with another aspect of the invention, therefore, each impeller is provided with a surface opening 44 (FIG. 5) together with a valve or cover 46 that is hinged to the impeller surface at 48 and controlled by rod 50 and link 52 to cover the opening when the impeller is moving downstream and expose the opening when the impeller is moving upstream. Rod 50 may be fixed length, as shown, or may be formed of telescoping members if the cross arms 22,24 are of the telescoping type, as discussed supra.

With reference to FIG. 6, synchronization of valve 46 to rotation of the impellers 22a, 22b, 24a, 24b relative to wind direction is controlled by a device 54 mounted on frame 36 above cross arms 22, 24. Valve synchronization device 54 rotates about the shaft axis and the instantaneous rotational position of the device is a function of wind direction. Thus, a conventional vane 58 extending radially from synchronization device 54 is guided by wind to rotate the device such that the vane points downstream of the wind at all times. As described in detail below, the rotational position of the vane 58 and device 54 controls synchronization of the valves 46 to enclose impeller openings 24 as each impeller is moving downstream and exposes the opening as the impeller moves upstream to maximize energy conversion efficiency.

Figure 8:
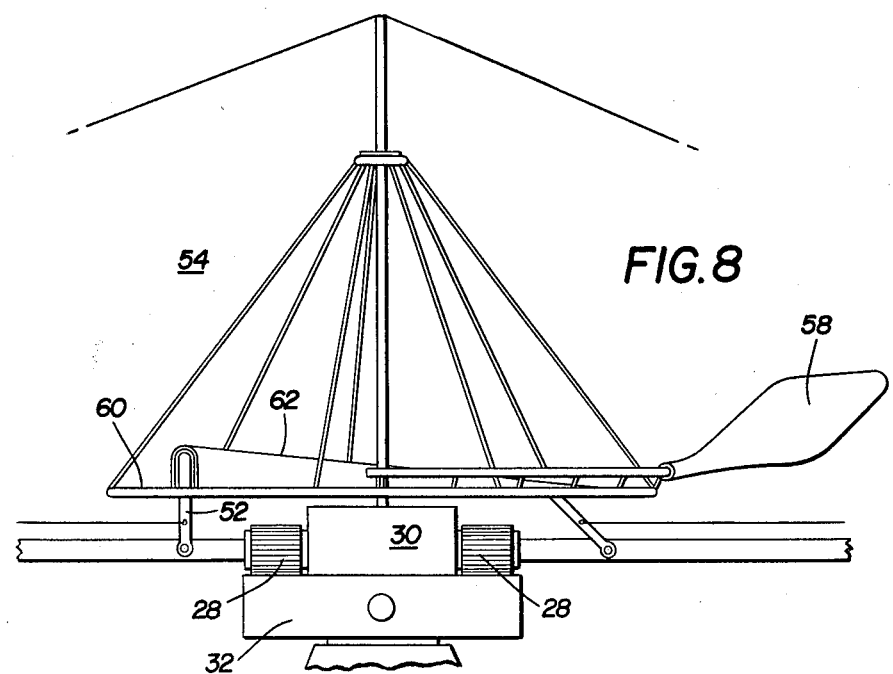
FIG. 8 is an elevational view of the embodiment shown in FIG. 7.

Referring to FIGS. 7 and 8, in accordance with one embodiment of synchronization device 54, carriage 60 of the device is supported on hub 30 with pinions 28 in engagement with ring gear 32, in the manner described above in connection with FIG. 2. Mounted on the carriage 60 is a cam 62 extending along a circumference of about 180° on the carriage surface and defining an inner guide slot 47 that is substantially vertical at one end of the carriage defined by the numeral 64 and substantially horizontal at the opposite end of the carriage defined by 66 in FIG. 7. The guide slot angle within the angle within the cam 62 varies continuously between the vertical and horizontal guide slot positions, and link 52, described above in connection with FIG. 5, is retained within the guide slot. As the carriage 60 is caused to rotate about hub 30 as a function of wind direction, the link 47 is pivoted about cross arm 22,24, as shown by the arrow in FIG. 5, to selectively open and close flap valve 46 at the proper times. Thus, with reference to FIG. 9, with the synchronization device 54 oriented in the position shown in response to wind direction, as the impellers rotate, the link 52 is controlled by cam 62 to pivot among the various positions identified by (A)-(F). When the position of each impeller corresponds to the (A) position, the link 52 extends vertically since this is the open area of the circumference of the synchronization device 54; there is no cam 62. When the impeller has rotated to position (B), the link 52 is within the vertical portion of slot 47 of cam 62, and as the impeller continues to rotate, the link 52 is pivoted continuously toward the surface of carriage 60 at the end portion (E) of the cam 62. Thereafter, with further rotation of the impeller, the link 52 is now outside cam 62 and is spring biased to index to the vertical position shown at (F).

The angular orientation of link 52 controls the degree of opening of valve 46, as shown in FIG. 5, such that the valve is closed while the link is vertical, i.e. outside cam 62 and opens gradually during travel of the link through the cam 62. Selective opening and closing of valve 46 are synchronized to wind direction as well as to rotational position of the impellers since the rotational position of the cam 62 itself is controlled by the position of vane 58 as a function of wind direction. Thus, as the impellers rotate in response to wind, opening and closing times of the valves 46 vary depending upon the particular rotational orientation of cam 62 controlled by vane 58 to follow wind direction. Alternatively, the position of cam 62 together with carriage 60 may be controlled by a servo (not shown) itself responsive to wind direction or may be controlled manually.

Figure 10:
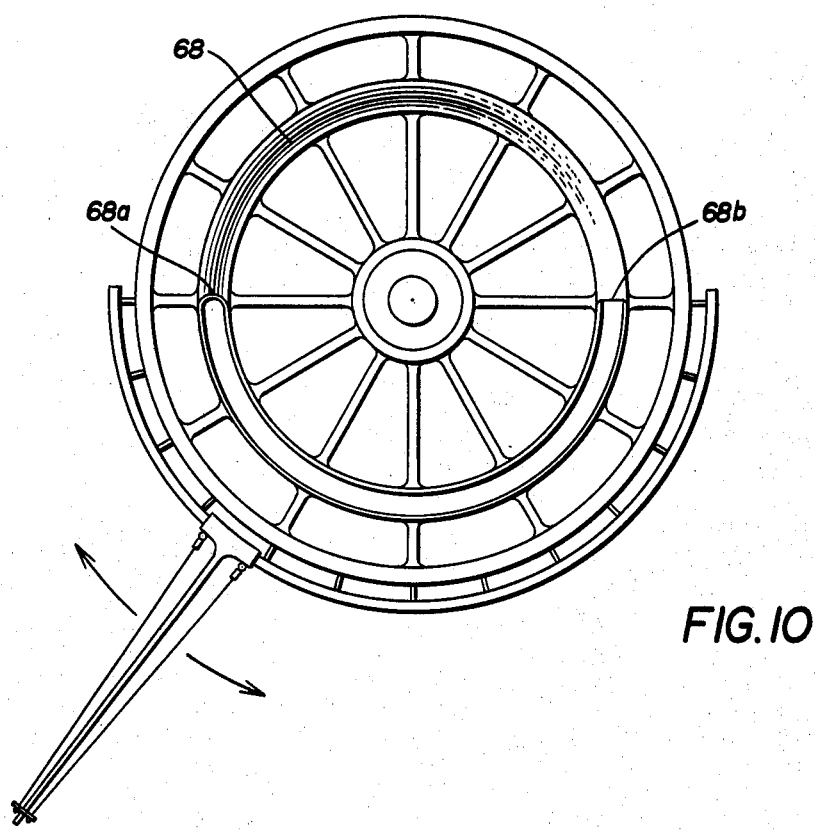
FIG. 10 is a plan view of a device for synchronizing the air spillthrough valves as a function of relative wind direction in accordance with a second embodiment of the invention.
Figure 11:
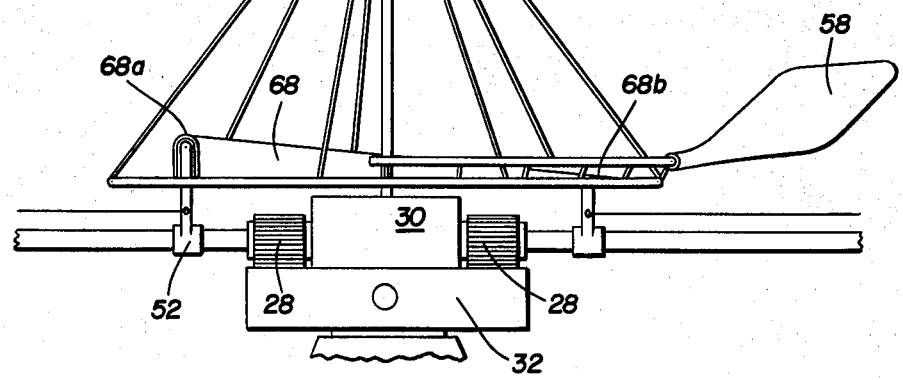
FIG. 11 is an elevation view of the embodiment of FIG. 10.

Another embodiment of the valve synchronization mechanism 54, shown in FIGS. 10 and 11, includes a cam 68 extending along an approximately 180° circumferential portion of carriage 60 and having a height that varies continuously from a maximum height at one end 68a to a minimum height at the opposite end 68b. Thus, a variable height guide slot is established within the cam 68 to receive valve control link 52. The link 52 is secured on its respective cross arm 22, 24 and is arranged to rotate the arm through a 90° angle of rotation above the arm axis as the link 52 travels the cam 68 between the ends 68a and 68b. Thus, whereas the link 52 is positioned vertically at cam portion 68a, the link is positioned at an acute angle to horizontal at cam portion 68b causing corresponding rotation of control rod 50. At the remaining circumferential portion of the carriage 60, that is, the portion that lacks cam 68, the link 52 is oriented in the vertical position and is maintained in that position by a spring (not shown) or other biasing means.

The impeller embodiments described heretofore have been in the form of hemispheres of the type described in the Wiggin U.S. Pat. No. 3,212,470. As further aforementioned, however, it is understood that other impeller configurations may be used in accordance with the principles of the present invention. As one example, with reference to FIGS. 12 and 13, each impeller comprises at least one semi-cylindrical member 70. If more than one member 70 is used, the members are spaced apart from each other to define an opening 72 between each pair of members. Each of the semi-cylindrical members 70 is formed with an additional opening 74, and opposite sides of the members have guide tracks 76. Sailcloth material 78 is positioned within the tracks 76 on opposite sides of members 70 and is adapted to ride between the tracks within the members 70. The sailcloth material 78 is itself formed with a series of openings 80 that correspond in position to openings 72 and 74 such that depending upon the position of the sailcloth material 78 within the members 70, the openings 72, 74 may be enclosed by sailcloth material or may be variably opened. The sailcloth material is normally spring biased into position to enclose openings 72, 74 within the impeller members 70. In response to indexing of the sailcloth material by a control rod, such as rod 50 in FIG. 5, as a function of impeller position and wind direction, as described in detail above, the air spillthrough openings 72 and 74 are selectively closed by sailcloth material 78 operating as closure valves. The impeller valve embodiment shown in FIGS. 12 and 13 is especially applicable to longitudinal control arm movements of the type developed by the valve synchronization device shown in FIGS. 7 and 8 rather than to rotary control valve movement of the type developed by the embodiment shown in FIGS. 10 and 11. Rigging to convert movement of the control rod 50 to longitudinal movement of the sailcloth with in tracks 76 is not shown for simplicity.

With reference now to FIG. 14, the apparatus 20 of the invention is incorporated on a sea vessel to generate power to directly operate the drive propellers or to operate auxiliary functions directly or via battery stored energy. In accordance with one aspect of the invention, the two sets of impellers are provided coaxially on a common shaft 84. The impeller members on the upper impeller array 86 are arranged to cause the array to rotate in one direction, e.g., clockwise, whereas the impellers on the lower array 88 are oriented to provide opposite rotation. Opposite sense rotation of the two impeller arrays is important since any torque applied to the shaft from one of the impeller arrays tends to undesirably steer the vessel port or starboard. Furthermore, as shown in FIG. 15, the two impeller arrays may be mounted to inner and outer shaft portions 90 and 92, with the inner shaft portion being rotatable within the outer shaft portion and with the outer shaft portion itself being rotatable with respect to the vessel hull. The inner and outer shaft portions 90, 92 together form a shaft means for transferring rotation of impeller arrays 86, 88 to an electric generator 94 within the hull. The outer shaft portion, or sleeve, 92 may be connected to generator stator 94 whereas the inner shaft portion is connected to the generator rotor 96. As the two impeller arrays 86 and 88 rotate in opposite directions, corresponding opposite sense rotation is imparted to the rotor and stator 96, 94 of the generator to develop increased output current generation.

The two impeller arrays 86 and 88 rotate, as aforementioned, in opposite directions to effectively cancel out any torque that would be applied to undesirably steer the sea vessel port or starboard. This principle can, however, be used to steer the vessel or augment steering by controlling or modulating one of the impeller arrays in the manner described above with respect to FIGS. 1 and 2, that is, by adjusting the angle between cross arms on a common impeller array. Thus, by reducing the cross arm angle with one of the arrays, that impeller array will become partially "spoiled" and the other array will tend to dominate, providing some steering to the vessel. This steering control can be provided manually or automatically using conventional navigation equipment.

An even more substantial controlled steering of the vessel can be provided by locating the two impeller arrays 86,88 on separate shafts, as shown in FIG. 16, whereby modulating one of the arrays in the manner described above will tend to control steering of the vessel.

Besides providing a possibility of steering a sea vessel, modulation of the impeller arrays 86, 88 provides protection of the impellers and vessels against successive winds which would otherwise tend to damage equipment. Thus, either one or both of the impeller arrays 86, 88 may be spoiled by reducing the angle between cross arms for storm protection. The impellers thus may be made substantially unresponsive to wind by controlling impeller angle manually, or may be provided automatically in response to measured wind flow velocity directly or indirectly by measuring stress applied to the various vessel hull parts.

Referring to FIGS. 17 and 18, a wedge type impeller 99, in accordance with one aspect of the invention, comprises a pair of planar wind collecting members 100,101 hinged together at connecting portion 102. The two collecting members 101,102 have opposite edges that are bridged by webs 103,104 made of cloth or other resilient material. The members 101,102 are indexed between a closed position shown in FIG. 17 to provide minimum resistance to air while the impeller 99 is moving upstream and an open position shown in FIG. 18 while the impeller is moving downstream. In FIG. 18, the side webs 103,104, together with collecting members 101,102, form an air scoop that efficiently collects a maximum quantity of wind to produce as much torque as possible for application to output shaft 26 (FIG. 3). Thus, the impeller 99 assumes a wedge-shaped configuration (inside view) in the open position and an approximately planar shape (parallel collecting members 100,101) in the closed position. A resilient line 105 neatly withdraws the side webs 103,104 within the impeller 99 when the impeller is closed (FIG. 17). Spring 106, in compression maintains collecting members 100, 101 normally open and thus assists opening of the impeller 99 against resistance by ambient wind forces. Indexing of the impeller 99 is provided by the apparatus of FIGS. 7–11, supra. In practice the orientation of the wedge-type impellers 99 relative to horizontal need not be controlled as a function of impeller rotation to provide air spill through as with fixed configuration impellers such as the cup-shaped members of FIG. 1. Thus, the driven gear mechanism of FIG. 2 may be eliminated if the impellers 19 if FIGS. 17 and 18 are used.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

I claim:

1. Apparatus for controlling the conversion of natural wind forces into useful energy comprising:
   a frame,
   shaft means rotatably mounted on said frame;
   first cross arm means connected to said shaft means having first impeller means disposed thereon to cause rotation of said first cross arm means and said shaft means means in response to wind;
   second cross arm means connected to said shaft means and disposed at an angle to said first cross arm means and having second impeller means disposed thereon to cause rotation of said second cross arm means and said shaft means in response to wind;
   adjustment means for moving said second cross arm means about said first axis relative to said first cross arm means to change selectively the angular position of said second cross arm means and second impeller means relative to said first cross arm means and first impeller means, whereby the speed of rotation of said shaft means may be controlled for varying wind conditions.

2. Apparatus according to claim 1, wherein said first and second cross arm means each includes a plurality of telescoping members forming length adjustment means.

3. Apparatus according to claim 1, including sensing means for controlling the engagement of said shaft means with a load until said shaft means has attained a predetermined speed.

4. Apparatus according to claim 1, including at least one additional set of said first and second arm and impeller means.

5. Apparatus according to claim 4, wherein both sets of said first and second arm means are disposed on a common axis.

6. Apparatus according to claim 4, wherein said sets of said first and second arm means are disposed respectively on different axes.

7. Apparatus according to claim 4 or 5 or 6, wherein said impeller means have a hemispherical shape.

8. Apparatus according to claim 4 or 5 or 6, wherein said impeller means include at least one member having a semi-cylindrical shape.

9. Apparatus according to claim 4 or 5 or 6, wherein said impeller means is indexable between open and closed positions, said impeller means having at least one member wedge-shaped in the open position, and approximately planar in the closed position.

10. Apparatus according to claim 7, including valve means for spilling out wind from said impeller means and means for varying the opening of said valve means as said impeller means rotates into a drag position with wind to reduce impeller drag.

11. Apparatus according to claim 8, including valve means for spilling out wind from said impeller means and means for varying the opening of said valve means as said impeller means rotates into a drag position to reduce impeller drag.

12. Apparatus for controlling the conversion of natural wind forces into useful energy comprising:
a frame,
a shaft means rotatably mounted on said frame;
arm means connected to said shaft means having impeller means disposed thereon to cause rotation of said arm means and said shaft means in response to wind;
said impeller means having an opening therein and valve means for selectively opening and closing said opening in said impeller means to spill out wind to reduce drag thereon; and
control means connected to said valve means to vary the position of said valve means relative to said opening to control the spilling of air from said impeller means as the impeller means rotates into a drag position to reduce impeller drag.

13. Apparatus according to claim 12, wherein said frame is provided with a track and further wherein said control means includes a hinge member rotatable on said arm means and pivotable upon sliding engagement with said track on said frame, said track having a tapered closed portion for about 180° of rotation and an open portion for about 180° rotation to control opening and closing said valve means.

14. Apparatus according to claim 12, wherein said track means has variable height.

15. Apparatus according to claim 12, wherein said track means has a variable width.

16. Apparatus for maneuvering and propelling a boat or the like comprising:
a boat hull,
first and second arm means mounted on a first vertical shaft means on said boat hull and having first and second impeller means associated therewith to cause rotation of said first and second arm means and first shaft means in a first direction in response to wind;
third and fourth arm means mounted on a second vertical shaft means on said boat hull and having third and fourth impeller means associated therewith to cause rotation of said third and fourth arm means and said second shaft means in a second direction in response to wind;
said second and fourth arm means being rotatable to change the position thereof relative to the first and third arm means, respectively, and
control means for selectively changing the relative position of said second and fourth arm means and associated impeller means relative to said first and third arm and impeller means, respectively, to maneuver and propel the boat hull in response to wind forces.

17. Apparatus according to claim 16, wherein said first and second shafts are mounted on a common axis.

18. Apparatus according to claim 16, wherein said first and second shafts are mounted on spaced apart, parallel axes.

19. Apparatus according to claim 5 or 15, wherein at least one of said shaft means includes an outer hollow shaft and an inner shaft rotatably positioned within said outer shaft and said apparatus further includes an electric generator having a stator and a rotor coupled, respectively, to said inner and outer shaft of said at least one shaft means.

* * * * *